(12) United States Patent
Heo et al.

(10) Patent No.: US 11,380,930 B2
(45) Date of Patent: Jul. 5, 2022

(54) FUEL CELL

(71) Applicants: Hyundai Motor Company, Seoul (KR); Kia Motors Corporation, Seoul (KR)

(72) Inventors: Yong Suk Heo, Seoul (KR); Suk Min Baeck, Seongnam-si (KR)

(73) Assignees: Hyundai Motor Company, Seoul (KR); Kia Motors Corporation, Seoul (KR)

(*) Notice: Subject to any disclaimer, the term of this patent is extended or adjusted under 35 U.S.C. 154(b) by 227 days.

(21) Appl. No.: 16/777,133

(22) Filed: Jan. 30, 2020

(65) Prior Publication Data

US 2021/0126274 A1  Apr. 29, 2021

(30) Foreign Application Priority Data

Oct. 25, 2019 (KR) .................. 10-2019-0133528

(51) Int. Cl.
*H01M 8/248* (2016.01)
*H01M 8/2485* (2016.01)
*H01M 8/2483* (2016.01)
*H01M 8/242* (2016.01)

(52) U.S. Cl.
CPC .......... *H01M 8/248* (2013.01); *H01M 8/242* (2013.01); *H01M 8/2483* (2016.02); *H01M 8/2485* (2013.01)

(58) Field of Classification Search
None
See application file for complete search history.

(56) References Cited

U.S. PATENT DOCUMENTS

2006/0024545 A1* 2/2006 Osenar ............. H01M 8/2475
429/458
2009/0214928 A1  8/2009 Kim et al.

FOREIGN PATENT DOCUMENTS

| KR | 100992737 B1 | 11/2010 |
|---|---|---|
| KR | 101466507 B1 | 11/2014 |
| KR | 101479836 B1 | 1/2015 |

* cited by examiner

*Primary Examiner* — Haroon S. Sheikh
(74) *Attorney, Agent, or Firm* — Slater Matsil, LLP

(57) ABSTRACT

A fuel cell is disclosed. The fuel cell includes a cell stack including a plurality of unit cells stacked in a first direction, an enclosure surrounding side portions of the cell stack and including at least one opening to expose at least one of opposite end portions of the cell stack therethrough, first and second end plates respectively disposed at the opposite end portions of the cell stack, and a gasket disposed between a target end plate disposed in the at least one opening in the enclosure, among the first and second end plates, and the enclosure in order to seal the cell stack.

20 Claims, 13 Drawing Sheets

FUEL CELL

CROSS-REFERENCE TO RELATED APPLICATIONS

This application claims priority to Korean Patent Application No. 10-2019-0133528, filed on Oct. 25, 2019, which application is hereby incorporated herein by reference.

TECHNICAL FIELD

Embodiments relate to a fuel cell.

BACKGROUND

In general, in a fuel cell for a vehicle, each of a plurality of unit cells generates electric energy using air supplied to one surface of a polymer electrolyte membrane and hydrogen supplied to the opposite surface of the polymer electrolyte membrane, and supplies the generated electric energy to a vehicle system. In order to clamp a plurality of unit cells, a fuel cell may include a clamping device including an end plate and a clamping bar.

In addition, a unit stack module may include a cell stack, in which a plurality of unit cells is stacked on one another, and a clamping device. This stack module may be provided in a singular number or in a plural number. In the case in which a plurality of stack modules is provided, a fuel cell requires a separate device capable of distributing hydrogen, air, and cooling water. Therefore, a fuel cell including a single stack module is preferred for reduction in production cost and simplification of the structure thereof. In addition, in the case of a vehicle in which packaging of the components is greatly restricted, like a car, a high-performance vehicle, or the like, a fuel cell including a single stack module is further preferred to minimize the height thereof.

Meanwhile, various sealing technologies have been developed to protect a cell stack in a fuel cell from external water, dust, or heat.

SUMMARY

Accordingly, embodiments are directed to a fuel cell that substantially obviates one or more problems due to limitations and disadvantages of the related art.

Embodiments provide a fuel cell having excellent sealing performance.

In one embodiment, a fuel cell may include a cell stack including a plurality of unit cells stacked in a first direction and an enclosure configured to surround side portions of the cell stack. The enclosure includes at least one opening to expose at least one of opposite end portions of the cell stack therethrough. First and second end plates are respectively disposed at the opposite end portions of the cell stack and a gasket is disposed between a target end plate disposed in the at least one opening in the enclosure, among the first and second end plates, and the enclosure. The gasket is configured to seal the cell stack.

For example, the target end plate may include a body including an inner surface that faces the cell stack and an outer surface that is opposite the inner surface.

For example, the fuel cell may further include a partition wall disposed so as to face at least a portion of the outer surface of the body in the first direction, and the partition wall may seal the cell stack together with the enclosure using the gasket.

For example, the fuel cell may further include a connecting portion connecting the body and the partition wall to each other.

For example, the body and the partition wall may be integrally formed with each other. In this case, the body, the partition wall, and the connecting portion may be integrally formed with each other.

Alternatively, for example, the body and the partition wall may be formed separately from each other. In this case, the connecting portion may be integrally formed with the body, and may be formed separately from the partition wall. Alternatively, the connecting portion may be integrally formed with the partition wall, and may be formed separately from the body.

For example, the fuel cell may further include a clamping member configured to clamp the cell stack together with the first and second end plates.

For example, the fuel cell may further include a coupling screw configured to penetrate the partition wall and the clamping member and to be inserted into the interior of the body.

For example, the fuel cell may further include a cap configured to cover the coupling screw.

For example, the body of the target end plate may include an insert portion having first rigidity and a shell portion having second rigidity lower than the first rigidity and configured to surround the insert portion, the body may include a blind hole into which the coupling screw is fastened, and the blind hole may penetrate the shell portion and may extend to the insert portion.

For example, the insert portion may include a metal material, and the shell portion may include an insulating resin.

For example, the outer surface of the body may include a non-manifold region in which no manifold is disposed and to which the partition wall is coupled, and a manifold region in which a manifold is disposed.

For example, the fuel cell may further include a gasket groove disposed in at least one of the enclosure or the partition wall to accommodate the gasket.

For example, the gasket groove may include a first groove disposed in the target end plate, and the first groove may include at least one of a 1-$1^{st}$ groove disposed in a portion of the partition wall that is opposite the enclosure in a second direction intersecting the first direction, or a 1-$2^{nd}$ groove extending from the 1-$1^{st}$ groove and disposed in a portion of the manifold region of the body that is opposite the enclosure in the second direction.

For example, the gasket groove may include a second groove disposed in the enclosure, and the second groove may include at least one of a 2-$1^{st}$ groove disposed in a portion of the enclosure that is opposite the partition wall in a second direction intersecting the first direction, or a 2-$2^{nd}$ groove extending from the 2-$1^{st}$ groove and disposed in a portion of the enclosure that is opposite the manifold region of the body in the second direction.

For example, the partition wall may include an end portion coupled to the enclosure and a first through-hole through which the coupling screw passes.

For example, the cap may include a cover portion configured to cover the coupling screw and a support portion extending from the cover portion in the first direction to be inserted into the first through-hole.

For example, the clamping member may include a first portion disposed on an upper portion of the cell stack and on an upper portion of the target end plate and a second portion bent and extending from the first portion to the outer surface of the body, and the second portion may include a second through-hole through which the coupling screw passes, the second through-hole being opposite a portion of the first through-hole.

For example, the second portion of the clamping member may be accommodated in the space between the body and the partition wall.

For example, the cap may be formed of rubber or a moisture-permeable material.

BRIEF DESCRIPTION OF THE DRAWINGS

Arrangements and embodiments may be described in detail with reference to the following drawings in which like reference numerals refer to like elements and wherein.

DETAILED DESCRIPTION OF ILLUSTRATIVE EMBODIMENTS

Figure 1:
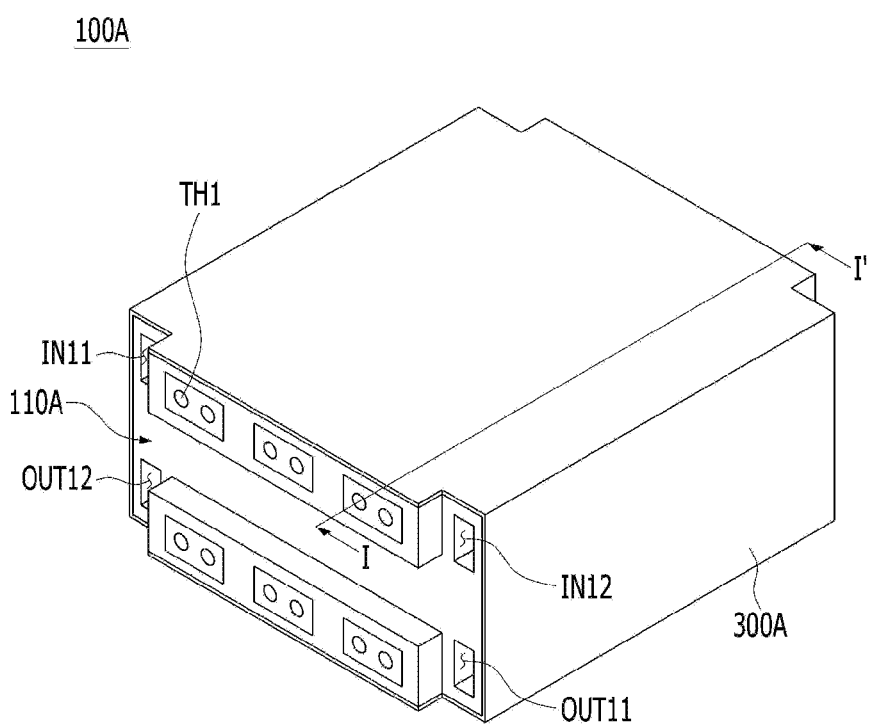
FIG. 1 is a perspective view showing the external appearance of a fuel cell according to an embodiment.

The present disclosure will now be described more fully hereinafter with reference to the accompanying drawings, in which various embodiments are shown. The examples, however, may be embodied in many different forms and should not be construed as being limited to the embodiments set forth herein. Rather, these embodiments are provided so that this disclosure will be more thorough and complete, and will more fully convey the scope of the disclosure to those skilled in the art.

It will be understood that when an element is referred to as being "on" or "under" another element, it may be directly on/under the element, or one or more intervening elements may also be present.

When an element is referred to as being "on" or "under", "under the element" as well as "on the element" may be included based on the element.

In addition, relational terms, such as "first", "second", "on/upper part/above" and "under/lower part/below", are used only to distinguish between one subject or element and another subject or element, without necessarily requiring or involving any physical or logical relationship or sequence between the subjects or elements.

Hereinafter, a fuel cell 100A or 100B according to embodiments will be described with reference to the accompanying drawings. The fuel cell 100A or 100B will be described using the Cartesian coordinate system (x-axis, y-axis, z-axis) for convenience of description. However, other different coordinate systems may be used. In the drawings, the x-axis, the y-axis, and the z-axis of the Cartesian coordinate system are perpendicular to each other. However, the embodiment is not limited thereto. That is, the x-axis, the y-axis, and the z-axis may intersect each other.

Figure 2:
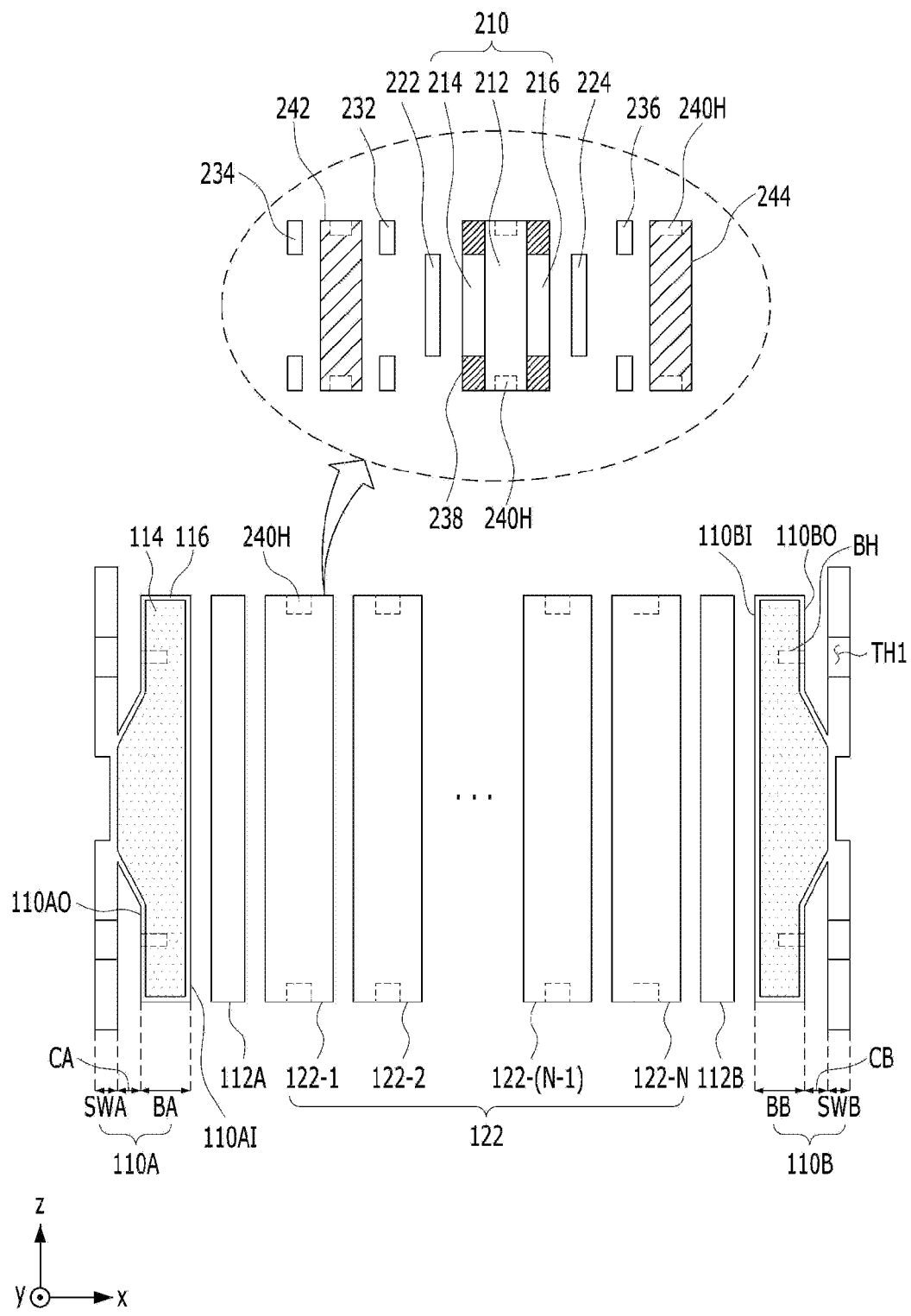
FIG. 2 is a cross-sectional view of an end plate and a cell stack of the fuel cell.
Figure 3:
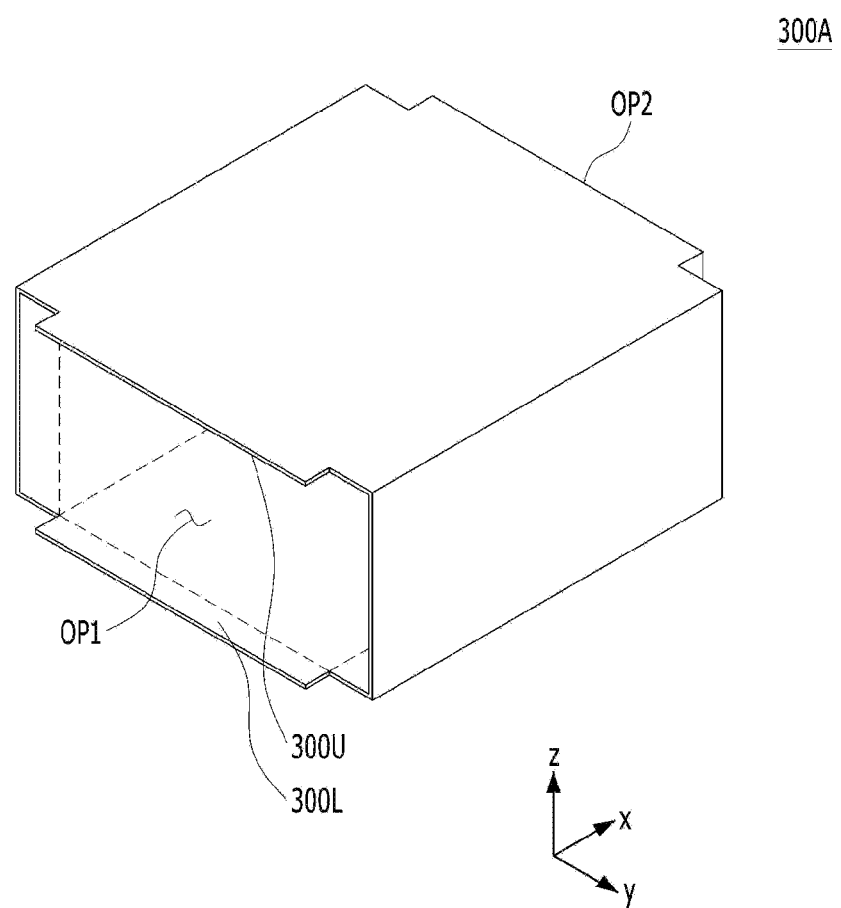
FIG. 3 is a perspective view of an enclosure according to an embodiment.
Figure 4:
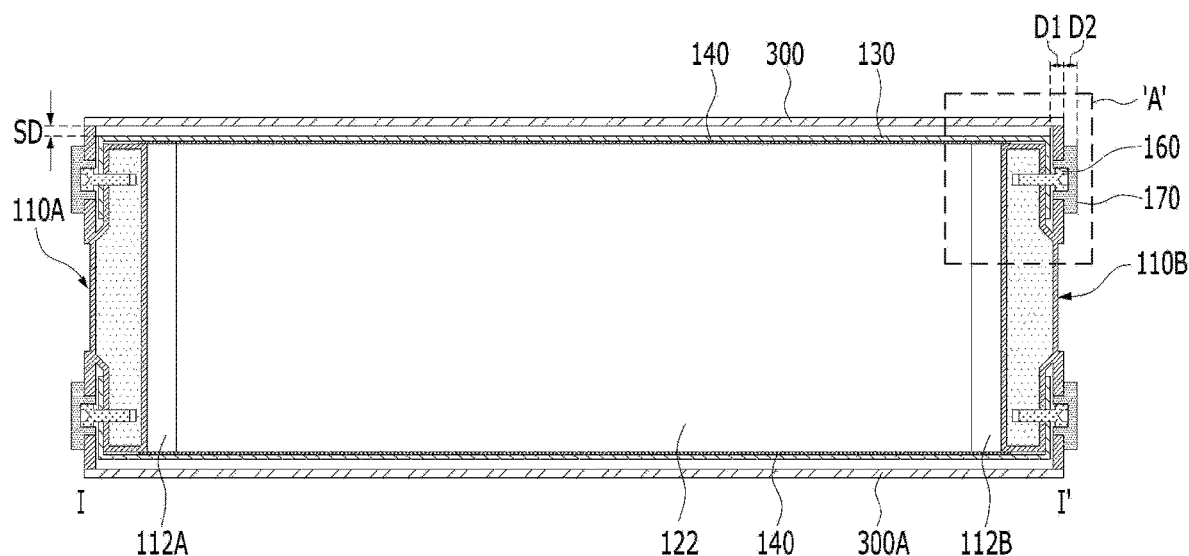
FIG. 4 is a cross-sectional view taken along line I-I' shown in FIG. 1.
Figure 5:
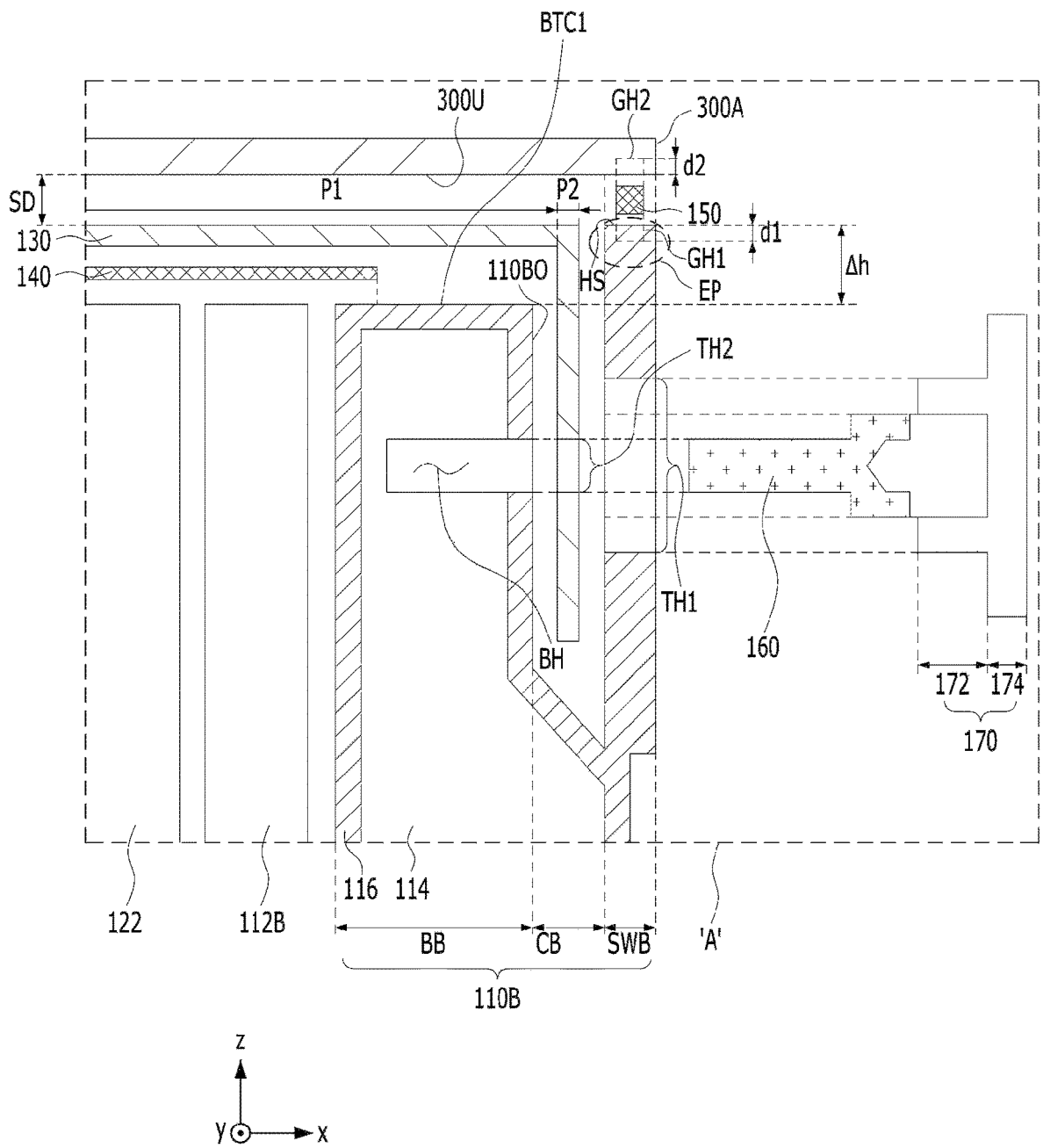
FIG. 5 is a partially exploded sectional view showing portion "A" in FIG. 4 in an enlarged manner.
Figure 6:
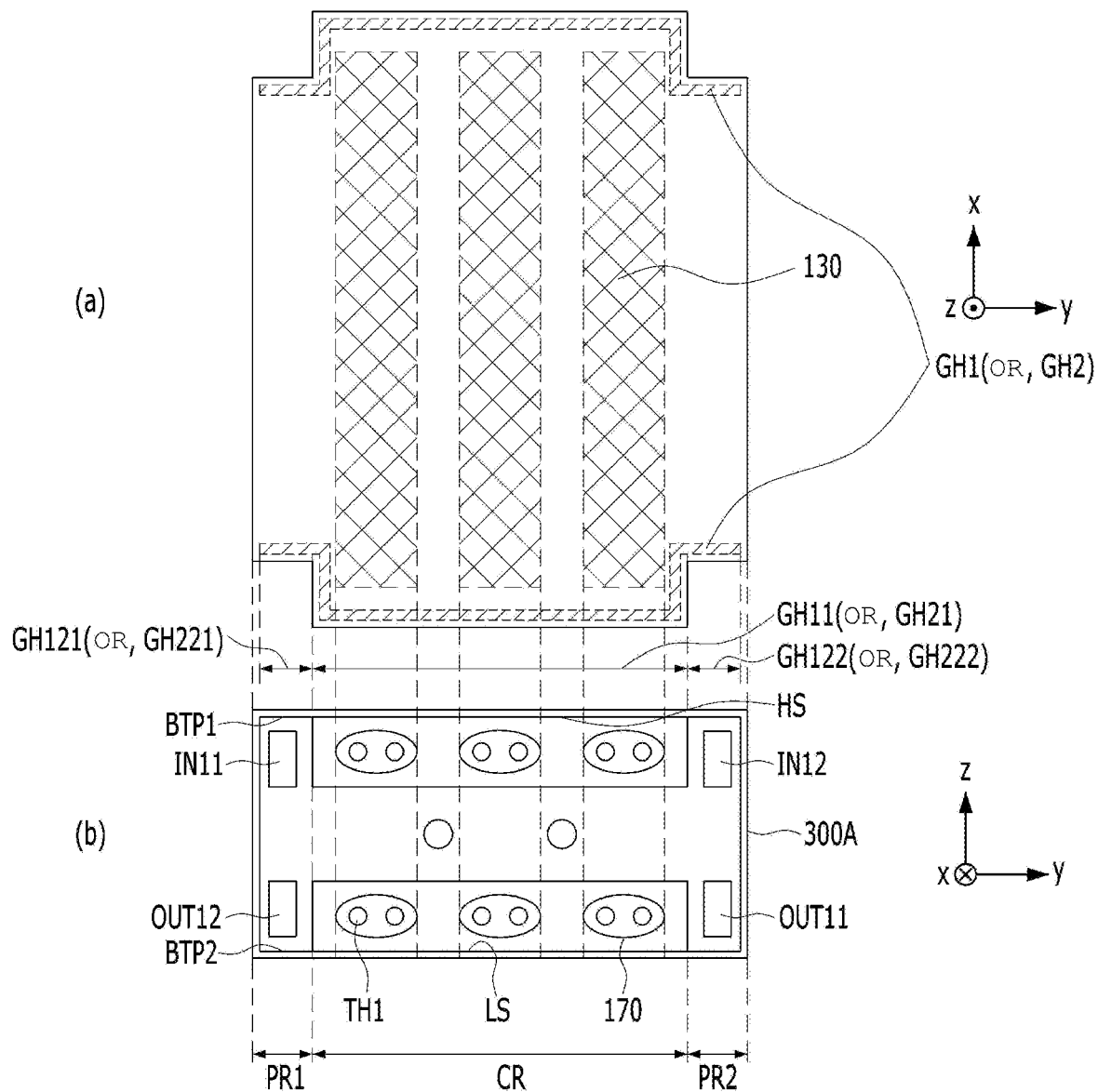
FIG. 6 is a plan view and a front view of the fuel cell according to the embodiment shown in FIG. 1.

FIG. 1 is a perspective view showing the external appearance of the fuel cell 100A according to an embodiment, FIG. 2 is a cross-sectional view of end plates (pressing plates or compression plates) 110A and 110B and a cell stack 122 of the fuel cell 100A, FIG. 3 is a perspective view of an enclosure 300A according to an embodiment, FIG. 4 is a cross-sectional view taken along line I-I' shown in FIG. 1, FIG. 5 is a partially exploded sectional view showing portion "A" in FIG. 4 in an enlarged manner, and FIG. 6 is a plan view at the portion labeled (a) and a front view in the portion labeled (b) of the fuel cell 100A according to the embodiment shown in FIG. 1.

The fuel cell 100A may be, for example, a polymer electrolyte membrane fuel cell (or a proton exchange membrane fuel cell) (PEMFC), which has been studied most extensively as a power source for driving vehicles. However, the embodiment is not limited to any specific form of the fuel cell.

The fuel cell 100A may include end plates 110A and 110B and a cell stack 122.

The cell stack 122 may include a plurality of unit cells, which are stacked in a first direction (e.g., the x-axis direction). Referring to FIG. 2, the cell stack 122 may include a plurality of unit cells 122-1 to 122-N, which are stacked in the first direction (e.g., the x-axis direction). Here, "N" is a positive integer of 1 or greater, and may range from several tens to several hundreds. "N" may range, for example, from 100 to 300, and may preferably be 220. However, the embodiment is not limited to any specific value of "N".

Each unit cell 122-$n$ (where $1 \leq n \leq N$) may generate 0.6 volts to 1.0 volts of electricity, on average 0.7 volts of electricity. Thus, "N" may be determined in accordance with the intensity of the power to be supplied from the fuel cell 100A to a load. Here, "load" may refer to a part of a vehicle that requires power.

Each unit cell 122-$n$ may include a membrane electrode assembly (MEA) 210, gas diffusion layers (GDLs) 222 and 224, first to third gaskets 232, 234 and 236, and separators (or bipolar plates) 242 and 244.

The membrane electrode assembly 210 has a structure in which catalyst electrode layers, in which electrochemical reaction occurs, are attached to both sides of an electrolyte membrane through which hydrogen ions move. Specifically, the membrane electrode assembly 210 may include a polymer electrolyte membrane (or a proton exchange membrane) 212, a fuel electrode (a hydrogen electrode or an anode) 214, and an air electrode (an oxygen electrode or a cathode) 216. In addition, the membrane electrode assembly 210 may further include a sub-gasket 238. The polymer electrolyte membrane 210 is disposed between the fuel electrode 214 and the air electrode 216. Hydrogen, which is the fuel in the fuel cell 100A, may be supplied to the fuel electrode 214 through the first separator 242, and air containing oxygen as an oxidizer may be supplied to the air electrode 216 through the second separator 244.

The hydrogen supplied to the fuel electrode 214 is decomposed into hydrogen ions (protons) (H+) and electrons (e−) by the catalyst. Only the hydrogen ions may be selectively transferred to the air electrode 216 through the polymer electrolyte membrane 212, and at the same time, the electrons may be transferred to the air electrode 216 through the gas diffusion layers 222 and 224 and the separators 242 and 244, which are conductors. In order to realize the above operation, a catalyst layer may be applied to each of the fuel electrode 214 and the air electrode 216. The movement of the electrons described above causes the electrons to flow through an external wire, thus generating current. That is, the fuel cell 100A may generate power due to the electrochemical reaction between hydrogen, which is the fuel, and oxygen contained in the air.

In some cases, the fuel electrode 214 may be referred to as an anode, and the air electrode 216 may be referred to as a cathode. Alternatively, the fuel electrode 214 may be referred to as a cathode, and the air electrode 216 may be referred to as an anode.

The gas diffusion layers 222 and 224 serve to uniformly distribute hydrogen and oxygen, which are reactant gases, and to transfer the generated electric energy. To this end, the gas diffusion layers 222 and 224 may be disposed on respective sides of the membrane electrode assembly 210. That is, the first gas diffusion layer 222 may be disposed on the left side of the fuel electrode 214, and the second gas diffusion layer 224 may be disposed on the right side of the air electrode 216. The first gas diffusion layer 222 may serve to diffuse and uniformly distribute hydrogen, supplied as a reactant gas, through the first separator 242, and may be electrically conductive. The second gas diffusion layer 224 may serve to diffuse and uniformly distribute air supplied as a reactant gas through the second separator 244, and may be electrically conductive.

The first to third gaskets 232, 234 and 236 may serve to maintain the airtightness and clamping pressure of the cell stack at an appropriate level with respect to the reactant gases and the coolant, to disperse the stress when the separators 242 and 244 are stacked, and to independently seal the flow paths. As such, since airtightness and watertightness are maintained by the first to third gaskets 232, 234 and 236, the flatness of the surfaces that are adjacent to the cell stack 122, which generates power, may be secured, and thus surface pressure may be distributed uniformly over the reaction surface of the cell stack 122.

The separators 242 and 244 may serve to move the reactant gases and the cooling medium and to separate each of the unit cells from the other unit cells. In addition, the separators 242 and 244 may serve to structurally support the membrane electrode assembly 210 and the gas diffusion layers 222 and 224 and to collect the generated current and transfer the collected current to the current collectors (not shown).

The current collectors may be disposed between the cell stack 122 and the inner surfaces 110AI and 110BI of the first and second end plates 110A and 110B that are opposite the cell stack 122. The current collectors serve to collect electric energy generated by the flow of electrons in the cell stack 122 and to supply the electric energy to a load of a vehicle that uses the fuel cell 100A.

The separators 242 and 244 may be disposed outside the gas diffusion layers 222 and 224, respectively. That is, the first separator 242 may be disposed on the left side of the first gas diffusion layer 222, and the second separator 244 may be disposed on the right side of the second gas diffusion layer 224. The first separator 242 serves to supply hydrogen as a reactant gas to the fuel electrode 214 through the first gas diffusion layer 222. To this end, the first separator 242 may include an anode plate (AP), in which channels (passages or flow paths) through which hydrogen flows are formed. The second separator 244 serves to supply air as a reactant gas to the air electrode 216 through the second gas diffusion layer 224. To this end, the second separator 244 may include a cathode plate (CP), in which channels through which air containing oxygen flows are formed. In addition, each of the first and second separators 242 and 244 may form channels through which a cooling medium (e.g., coolant) flows. In addition, the separators 242 and 244 may be formed of a graphite-based material, a composite graphite-based material, or a metal-based material. However, the embodiment is not limited to any specific material of the separators 242 and 244.

In addition, as shown in FIG. 2, the fuel cell 100A may further include a first end cell heater 112A, which is disposed between the cell stack 122 and the first end plate 110A, and a second end cell heater 112B, which is disposed between the cell stack 122 and the second end plate 110B.

Each of the first and second end plates 110A and 100B may be disposed at a respective one of both ends of the cell stack 122, and may support and fix the unit cells. That is, the first end plate 110A may be disposed at one end of the cell stack 122, and the second end plate 110B may be disposed at the opposite end of the cell stack 122.

The first end plate 110A may include a plurality of manifolds (or communication portions). For example, as shown in FIGS. 1 and 6, the first end plate 110A may include a plurality of manifolds IN11, IN12, OUT11 and OUT12.

Reactant gas required for the membrane electrode assembly 210 may be introduced through the first and second inflow communication portions IN11 and IN12, and gas or liquid to which reactant gas, which is humidified and supplied, and condensate water generated in the cell are added may be discharged outside the fuel cell 100A through the first and second outflow communication portions OUT11 and OUT12.

In addition, the second end plate 110B may also include a plurality of manifolds (or communication portions). For example, although not illustrated, the second end plate 110B may include a plurality of manifolds (or communication portions) IN13 and OUT13. A cooling medium may be introduced into the cell stack 122 from the outside through the third inflow communication portion IN13, and the cooling medium may be discharged outside from the inside of the cell stack 122 through the third outflow communication portion OUT13. Alternatively, unlike the configuration shown in the drawings, the third inflow communication portion IN13 may be disposed between the first inflow communication portion IN11 and the second outflow communication portion OUT12 in the first end plate 110A, and the third outflow communication portion OUT13 may be disposed between the second inflow communication portion IN12 and the first outflow communication portion OUT11 in the first end plate 110A.

According to the embodiment, the fuel cell 100A may further include an insulating plate 140. The insulating plate 140 is disposed between the cell stack 122 and the clamping member 130, and serves to electrically insulate the cell stack 122 and the clamping member 130 from each other.

In addition, the fuel cell 100A may further include an enclosure 300A and a fourth gasket 150.

According to one embodiment, the enclosure 300A may be a four-sided enclosure that covers the side portions of the cell stack 122 and includes first and second openings OP1 and OP2 to expose opposite end portions of the cell stack 122 therethrough. In this case, the first end plate 110A may be disposed in the first opening OP1 in the enclosure 300A, and the second end plate 110B may be disposed in the second opening OP2 in the enclosure 300A.

According to another embodiment, the enclosure 300A may be a five-sided enclosure that covers the side portions of the cell stack 122 and any one of opposite end portions of the cell stack 122 and includes only any one of the first opening OP1 and the second opening OP2. In this case, one of the first and second end plates 110A and 110B may be disposed at one end portion of the cell stack 122 that is opposite one of the openings OP1 and OP2 in the enclosure 300A, and the other one of the first and second end plates 110A and 110B may be disposed between the opposite end portion of the cell stack 122 and the enclosure 300A.

Although it is illustrated in FIG. 3 that the enclosure 300A is formed in a single piece, the embodiment is not limited thereto. According to another embodiment, the enclosure 300A may be formed such that at least two bodies are coupled to each other. For example, one of the two bodies of the enclosure 300A may have a "¬" shape, and the other one of the two bodies may have an "L" shape so as to be coupled to the "¬" shaped body. Alternatively, one of the two bodies of the enclosure 300A may have a "⊏" shape, and the other one of the two bodies may have a "-" shape so as to be coupled to the "⊏" shaped body.

Hereinafter, among the first and second end plates 110A and 110B, the end plate disposed in the opening in the enclosure 300A will be referred to as a "target end plate". That is, when the enclosure 300A is a four-sided enclosure, each of the first and second end plates 110A and 110B, which is disposed in a respective one of the first and second openings OP1 and OP2, corresponds to the target end plate. Alternatively, when the enclosure 300A is a five-sided enclosure, among the first and second end plates 110A and 110B, the end plate disposed in any one of the first and second openings OP1 and OP2 corresponds to the target end plate.

Hereinafter, the case in which each of the first and second end plates 110A and 110B is a target end plate will be described. However, the following description may also be applied to the case in which only one of the first and second end plates 110A and 110B is a target end plate.

In this case, the fourth gasket 150 is disposed between the enclosure 300A and the target end plate, and thus the cell stack 122 is sealed so as to be protected from at least one of external water, dust, or heat. For example, the fourth gasket 150 may be disposed between the enclosure 300A and the first end plate 110A (e.g., a body BA to be described later) and between the enclosure 300A and the second end plate 110B (e.g., a body BB to be described later).

Hereinafter, the configuration of the fuel cell 100A for sealing the cell stack 122 will be described in detail.

The first end plate 110A may include a body BA, and the second end plate 110B may include a body BB. In addition, the fuel cell 100A according to an embodiment may further include partition walls SWA and SWB. In addition, the fuel cell 100A according to an embodiment may further include connecting portions CA and CB.

The body BA may include an inner surface 110AI, which faces the cell stack 122, and an outer surface 110AO, which is opposite the inner surface 110AI. The body BB may include an inner surface 110BI, which faces the cell stack 122, and an outer surface 110BO, which is opposite the inner surface 110BI.

In addition, each of the bodies BA and BB of the first and second end plates 110A and 110B may include an insert portion 114 and a shell portion 116. The insert portion 114 may have first rigidity, and the shell portion 116 may have second rigidity, which is lower than the first rigidity, and may be formed to cover the insert portion 114. For example, the insert portion 114 may include a metal material, and the shell portion 116 may include an insulating resin, e.g., plastic. The metallic insert portion 114 of each of the first and second end plates 110A and 110B may have a high rigidity property to withstand internal surface pressure, and may be implemented by machining a metal material.

Alternatively, only the body BA or BB of the target end plate, among the first and second end plates 110A and 110B, may be formed such that the metallic insert portion 114 is surrounded by the injection-molded plastic 116. When the metallic insert portion 114 has higher rigidity than the shell portion 114, a coupling screw 160 may be more securely fastened into the metallic insert portion 114 of the target end plate among the first and second end plates 110A and 110B, which will be described later.

Each of the first and second end plates 110A and 110B may be formed by combining a plurality of plates.

When the enclosure 300A is a four-sided enclosure including first and second openings OP1 and OP2, the partition wall SWA may face at least a portion of the outer surface 110AO of the body BA in the first direction (e.g., the x-axis direction), the partition wall SWB may face at least a portion of the outer surface 110BO of the body BB in the first direction (e.g., the x-axis direction), and the partition walls SWA and SWB may seal the cell stack 122 together with the enclosure 300A using the fourth gasket 150. To this end, the fourth gasket 150 may be disposed between the bodies BA and BB and the enclosure 300A and between the partition walls SWA and SWB and the enclosure 300A.

When the enclosure 300A is a five-sided enclosure including only the first opening OP1, the first end plate 110A disposed in the first opening OP1 corresponds to a target end plate. In this case, the partition wall SWA may face at least a portion of the outer surface 110AO of the body BA in the first direction (e.g., the x-axis direction), and the partition wall SWA may seal the cell stack 122 together with the enclosure 300A using the fourth gasket 150. To this end, the fourth gasket 150 may be disposed between the body BA and the enclosure 300A and between the partition wall SWA and the enclosure 300A.

Alternatively, when the enclosure 300A is a five-sided enclosure including only the second opening OP2, the second end plate 110B disposed in the second opening OP2 corresponds to a target end plate. In this case, the partition wall SWB may face at least a portion of the outer surface 110BO of the body BB in the first direction (e.g., the x-axis direction), and the partition wall SWB may seal the cell stack 122 together with the enclosure 300A using the fourth gasket 150. To this end, the fourth gasket 150 may be disposed between the body BB and the enclosure 300A and between the partition wall SWB and the enclosure 300A.

Hereinafter, a fuel cell 100B according to another embodiment will be described with reference to the accompanying drawings.

Figure 7:
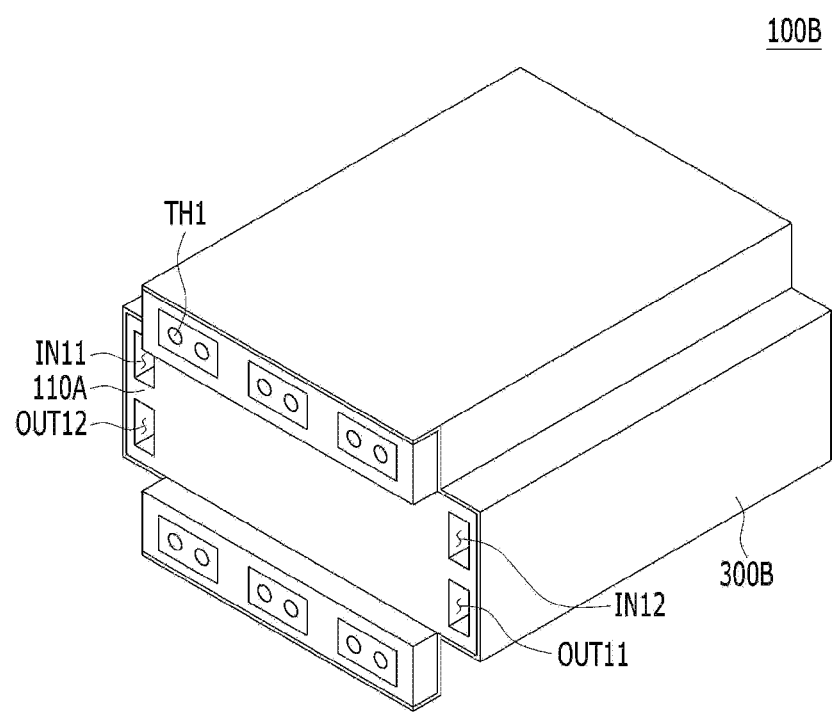
FIG. 7 is a perspective view showing the external appearance of a fuel cell according to another embodiment.
Figure 8:
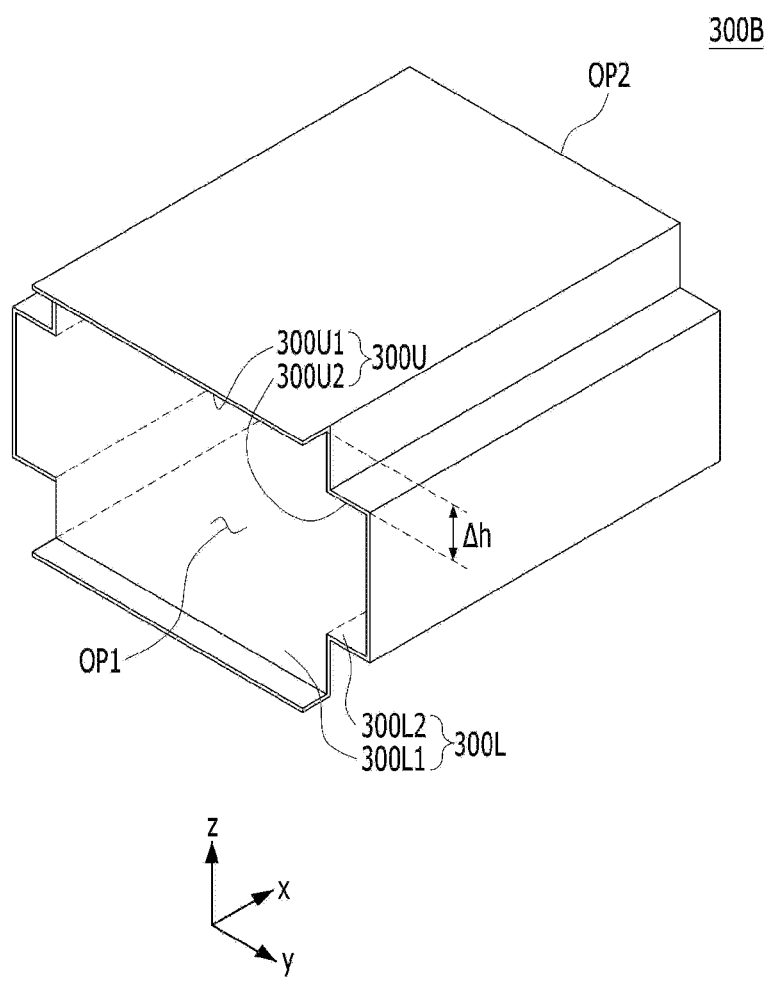
FIG. 8 is a perspective view of an enclosure according to another embodiment.
Figure 9:
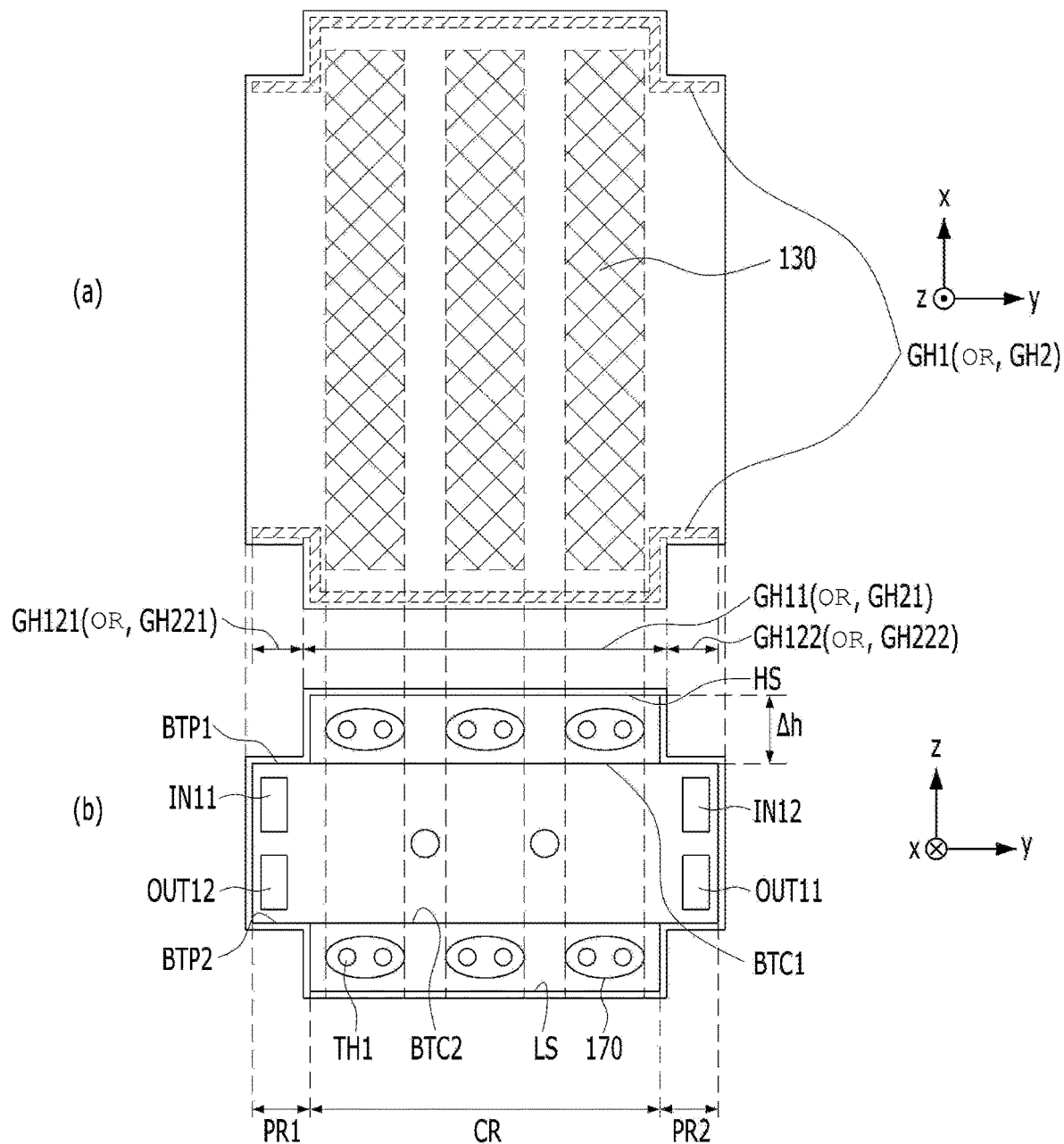
FIG. 9 is a plan view and a front view of the fuel cell according to another embodiment shown in FIG. 7.

FIG. 7 is a perspective view showing the external appearance of a fuel cell 100B according to another embodiment, FIG. 8 is a perspective view of an enclosure 300B according to another embodiment, and FIG. 9 is a plan view in the portion labeled (a) and a front view in the portion labeled (b) of the fuel cell 100B according to another embodiment shown in FIG. 7.

According to an embodiment, the body BA or BB and the partition wall SWA or SWB may be integrally formed with each other. For example, as illustrated in FIGS. 2, 4 and 5, the body BA (e.g., the shell portion 116), the partition wall SWA, and the connecting portion CA may be integrally formed with each other, and the body BB (e.g., the shell portion 116), the partition wall SWB, and the connecting portion CB may be integrally formed with each other. In this case, the body BA, the partition wall SWA, and the connecting portion CA may be included as the components of the first end plate 110A, and the body BB, the partition wall SWB, and the connecting portion CB may be included as the components of the second end plate 110B.

Figure 10A:
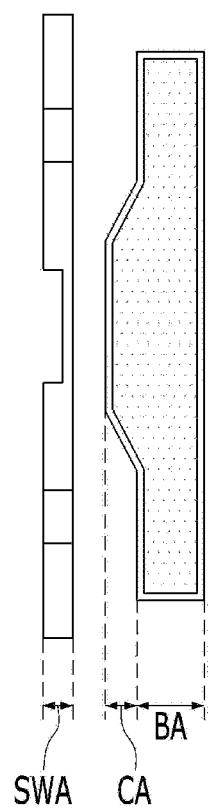
FIGS. 10A and 10B are cross-sectional views for explaining the coupling relationships among a connecting portion, a body, and a partition wall.
Figure 10B:
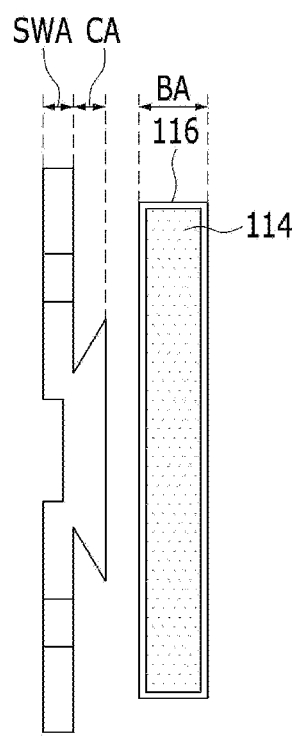

FIGS. 10A and 10B are cross-sectional views for explaining the coupling relationships among the connecting portion CA, the body BA, and the partition wall SWA. Although not illustrated, the following description of the coupling relationships among the connecting portion CA, the body BA, and the partition wall SWA shown in FIGS. 10A and 10B may also be applied to the coupling relationships among the connecting portion CB, the body BB, and the partition wall SWB.

According to another embodiment, the body BA or BB and the partition wall SWA or SWB may be formed separately from each other, unlike the configuration shown in FIG. 5.

In one example, the connecting portion CA or CB may be integrally formed with the body BA or BB, and may be formed separately from the partition wall SWA or SWB. For example, as shown in FIG. 10A, the connecting portion CA may be integrally formed with the body BA, and may be formed separately from the partition wall SWA. In this case, the connecting portion CA protruding from the body BA may be coupled to the partition wall SWA.

In another example, the connecting portion CA or CB may be integrally formed with the partition wall SWA or SWB, and may be formed separately from the body BA or BB. For example, as shown in FIG. 10B, the connecting portion CA may be integrally formed with the partition wall SWA, and may be formed separately from the body BA. In this case, the connecting portion CA protruding from the partition wall SWA may be coupled to the body BA.

In still another example, the connecting portion CA or CB may be omitted. In this case, the partition wall SWA or SWB may be directly coupled to the body BA or BB.

The outer surface 110AO or 110BO of the body BA or BB may include a "non-manifold region" and a "manifold region". The "non-manifold region" may be a region of the body BA or BB in which no manifold is disposed, and the "manifold region" may be a region of the body BA or BB in which a manifold is disposed.

The partition wall SWA or SWB is coupled to the non-manifold region of the body BA or BB, but is not coupled to the manifold region of the body BA or BB. The reason for this is to prevent the partition wall SWA or SWB from obstructing the flow of a fluid through the manifold.

For example, in the fuel cell 100A or 100B according to the above-described embodiment, the center region CR may correspond to a non-manifold region, and the peripheral regions PR1 and PR2 located outside the center region CR may correspond to a manifold region. Therefore, the partition wall SWA or SWB is coupled to the center region CR of the body BA or BB, but is not coupled to the peripheral regions PR1 and PR2. However, the manifold may be located at any of various positions in the separators and the end plates. Considering this, in the fuel cell 110A or 100B according to the embodiment, the partition wall SWA or SWB may be coupled to any of a non-manifold region of the body BA or BB in which no manifold is disposed. That is, unlike the configuration shown in FIGS. 1, 6, 7 and 9, when the center region CR of the body BA or BB is a manifold region and the peripheral regions PR1 and PR2 are non-manifold regions, the partition wall SWA or SWB may be coupled to the peripheral regions PR1 and PR2 of the body BA or BB.

Therefore, for convenience of description, the case in which the center region CR corresponds to a non-manifold region and the peripheral regions PR1 and PR2 correspond to a manifold region will be described below by way of example. However, the following description may also be applied to the case in which the center region CR corresponds to a manifold region and the peripheral regions PR1 and PR2 correspond to a non-manifold region.

In addition, in the case of the fuel cell 100A according to an embodiment, a first top surface BTC1 (refer to FIG. 5) of the center region CR of the body BA or BB of the first or second end plate 110A or 110B and a second top surface BTP1 (refer to FIG. 6) of the peripheral regions PR1 and PR2 of the body BA or BB may have a height difference $\Delta h$ therebetween. That is, the first top surface BTC1 may be lower than the second top surface BTP1 by the height difference $\Delta h$ on the basis of the ground. Similarly, a first bottom surface BTC2 of the center region CR of the body BA or BB of the first or second end plate 110A or 110B and a second bottom surface BTP2 (refer to FIG. 6) of the peripheral regions PR1 and PR2 of the body BA or BB may have a height difference $\Delta h$ therebetween. That is, the first bottom surface BTC2 may be higher than the second bottom surface BTP2 by the height difference $\Delta h$ on the basis of the ground.

In the case of the fuel cell 100B according to another embodiment, as shown in FIG. 9, a first top surface BTC1 of the center region CR of the body BA or BB of the first or second end plate 110A or 110B and a second top surface BTP1 of the peripheral regions PR1 and PR2 of the body BA or BB may not have a height difference $\Delta h$ therebetween. That is, the first top surface BTC1 and the second top surface BTP1 may have the same height. Similarly, a first bottom surface BTC2 of the center region CR of the body BA or BB of the first or second end plate 110A or 110B and a second bottom surface BTP2 of the peripheral regions PR1 and PR2 of the body BA or BB may not have a height difference $\Delta h$ therebetween. That is, the first bottom surface BTC2 and the second bottom surface BTP2 may have the same height.

In addition, according to one embodiment, as shown in FIG. 3, each of an inner surface of an upper portion (hereinafter referred to as an "upper surface") 300U and an inner surface of a lower portion (hereinafter referred to as a "lower surface") 300L of the enclosure 300A included in the fuel cell 100A may not have a stepped portion in a third direction (e.g., the y-axis direction), which intersects the first direction.

According to another embodiment, as shown in FIG. 8, each of the upper surface 300U and the lower surface 300L of the enclosure 300B included in the fuel cell 100B may have a stepped portion.

That is, a first upper surface 300U1 of the enclosure 300B that is in contact with the partition wall SWA or SWB, which is coupled to the center region CR of the body BA or BB, and a second upper surface 300U2 of the enclosure 300B that is in contact with the peripheral regions PR1 and PR2 of the body BA or BB may have a stepped portion (i.e. a height difference $\Delta h$) therebetween.

In addition, a first lower surface 300L1 of the enclosure 300B that is in contact with the partition wall SWA or SWB, which is coupled to the center region CR of the body BA or BB, and a second lower surface 300L2 of the enclosure 300B that is in contact with the peripheral regions PR1 and PR2 of the body BA or BB may have a stepped portion (i.e. a height difference Δh) therebetween. Since the fuel cell 100B according to another embodiment is the same as the fuel cell 100A according to one embodiment except for the above-described difference, a duplicate description thereof will be omitted. In the case in which a description of the fuel cell 100B according to another embodiment is omitted, the description of the fuel cell 100A according to one embodiment may be applied thereto.

In addition, the partition wall SWA or SWB may be manufactured in any of various forms.

According to one embodiment, the body BA or BB (e.g., the shell portion 116) and the partition wall SWA or SWB may be integrally formed with each other through a single injection-molding process using insert overmolding and molds.

According to another embodiment, the partition wall SWA or SWB may be physically coupled to the body BA or BB by welding the partition wall SWA or SWB to the body BA or BB through a vibration welding or laser welding method. In this case, a conventional body having no partition wall may be recycled to manufacture a fuel cell including the partition walls SWA and SWB.

As a first example, a method of manufacturing the fuel cell 100A according to one embodiment, in which the body BA or BB (e.g., the shell portion 116) and the partition wall SWA or SWB are not integrally formed but are formed separately from each other, will be described below.

Before the partition wall SWA or SWB is coupled to the body BA or BB, as described above, the first top surface BTC1 may be lower than the second top surface BTP1 by the height difference Δh, and the first bottom surface BTC2 may be higher than the second bottom surface BTP2 by the height difference Δh on the basis of the ground. Subsequently, when the partition wall SWA or SWB is coupled to the center region CR of the body BA or BB of the first or second end plate 110A or 110B, the upper surface HS of the partition wall SWA or SWB that is coupled to the center region CR of the body BA or BB and the second top surface BTP1 of the peripheral regions PR1 and PR2 of the body BA or BB may be placed on the same horizontal plane, and the lower surface LS of the partition wall SWA or SWB that is coupled to the center region CR of the body BA or BB and the second bottom surface BTP2 of the peripheral regions PR1 and PR2 of the body BA or BB may be placed on the same horizontal plane. That is, the height of the upper surface HS and the height of the second top surface BTP1 become the same, and the height of the lower surface LS and the height of the second bottom surface BTP2 become the same. Accordingly, the upper surface HS and the second top surface BTP1 shown in FIG. 6 may hermetically contact the upper surface 300U having no uneven portion, i.e. no stepped portion, of the enclosure 300A shown in FIG. 3. The lower surface LS and the second bottom surface BTP2 shown in FIG. 6 may bermetically contact the lower surface 300L having no uneven portion, i.e. no stepped portion, of the enclosure 300A shown in FIG. 3.

As a second example, a method of manufacturing the fuel cell 100B according to another embodiment, in which the body BA or BB and the partition wall SWA or SWB are formed separately from each other, will be described below.

Before the partition wall SWA or SWB is coupled to the body BA or BB, as described above, the first top surface BTC1 and the second top surface BTP1 may have the same height, and the first bottom surface BTC2 and the second bottom surface BTP2 may have the same height. Subsequently, when the partition wall SWA or SWB is coupled to the center region CR of the body BA or BB of the first or second end plate 110A or 110B, the upper surface HS of the partition wall SWA or SWB that is coupled to the center region CR of the body BA or BB and the second top surface BTP1 of the peripheral regions PR1 and PR2 of the body BA or BB may have a height difference Δh. That is, the upper surface HS may be higher than the second top surface BTP1 by the height difference Δh, and the lower surface LS may be lower than the second bottom surface BTC2 by the height difference Δh on the basis of the ground. However, since the first and second upper surfaces 300U1 and 300U2 of the enclosure 300B have a height difference Δh corresponding to the height difference Δh between the upper surface HS and the second top surface BTP1, the upper surface HS and the second top surface BTP1 may hermetically contact the upper surface 300U having an uneven portion, i.e. a stepped portion, of the enclosure 300B. In addition, since the first and second lower surfaces 300L1 and 300L2 of the enclosure 300B have a height difference Δh corresponding to the height difference Δh between the lower surface LS and the second bottom surface BTP2, the lower surface LS and the second bottom surface BTP2 may bermetically contact the lower surface 300L having an uneven portion, i.e. a stepped portion, of the enclosure 300B.

The fuel cell 100A according to the embodiment may further include a coupling screw 160. The coupling screw 160 may penetrate each of the partition walls SWA and SWB and the clamping member 130 and may be inserted into and fixed to the interior of each of the bodies BA and BB. To this end, each of the bodies BA and BB may include a blind hole BH formed therein. The coupling screw 160 may be fastened into the blind hole BH. The blind hole BH may penetrate the shell portion 116 and may extend to the insert portion 114. Each of the partition walls SWA and SWB may include a first through-hole TH1 through which the coupling screw 160 passes.

If the bodies BA and BB are formed of plastic in order to electrically insulate the enclosure 300A from the first and second end plates 110A and 110B, or if the blind hole BH, into which the coupling screw 160 is fastened, is formed only in the shell portion 116, rather than extending to the insert portion 114 of each of the bodies BA and BB, the coupling force between the coupling screw 160 and each of the first and second end plates 110A and 110B may be reduced.

However, according to the embodiment, the blind hole BH, into which the coupling screw 160 is fastened, extends to the metallic insert portion 114, thereby increasing the coupling force between the coupling screw 160 and each of the first and second end plates 110A and 110B.

In addition, the fuel cell 100A may further include a cap 170. Referring to FIG. 6, the cap 170 may be disposed so as to cover the coupling screw 160. Therefore, the coupling screw 160 is covered with the cap 170 and thus is not seen from the outside. However, in order to help understand the embodiment, the first through-hole TH1 is indicated by a solid line in FIGS. 6 and 9, and an illustration of the coupling screw 160 is omitted from FIGS. 6 and 9. As such, when the cap 170 is disposed so as to cover the coupling screw 160, the cap 170 may prevent external foreign substances from being introduced into the fuel cell 100A or 100B through a gap between the coupling screw 160 and each of the partition walls SWA and SWB, thereby further improving the sealing structure.

According to the embodiment, the cap 170 may include a support portion 172 and a cover portion 174. The cover portion 174 serves to cover the coupling screw 160. The support portion 172 may extend from the cover portion 174 in the first direction (e.g., the x-axis direction), and may be inserted into the first through-hole TH1.

According to the embodiment, the cap 170 may be formed of rubber or a moisture-permeable material. However, the embodiment is not limited thereto. For example, the cap 170 may be formed of EPDM, VQM, fluorine-based rubber, or the like.

Alternatively, the cap 170 may be formed of a moisture-permeable material such as Gore-Tex. In this case, moisture in the fuel cell 100A or 100B is discharged to the outside, whereas external moisture is prevented from being introduced into the fuel cell 100A or 100B, thereby maximizing the ventilation effect.

In addition, as shown in FIGS. 6 and 9, the front side of the cap 170 may have an elliptical shape, but the embodiment is not limited thereto. That is, according to another embodiment, the front side of the cap 170 may have a circular shape or a polygonal shape.

Since the enclosure 300A or 300B needs to be coupled to the upper surface HS and the lower surface LS of each of the partition walls SWA and SWB, as shown in FIGS. 3 and 8, the center region CR of the enclosure 300A or 300B may be formed to protrude in the first direction (e.g., the x-axis direction) when viewed in plan, which will be described later.

According to the embodiment, the fuel cell 100A may further include a gasket groove. The gasket groove is disposed in at least one of the enclosure 300A or the partition walls SWA and SWB, and serves to accommodate the fourth gasket 150.

Referring to FIGS. 5 and 6, a gasket groove (hereinafter referred to as a "first groove") GH1, which is disposed in each of the first and second end plates 110A and 110B, may include at least one of a 1-1$^{st}$ groove GH11 or 1-2$^{nd}$ grooves GH121 and GH122. The 1-1$^{st}$ groove GH11 may be disposed in a portion of each of the partition walls SWA and SWB that is opposite the enclosure 300A in a second direction (e.g., the z-axis direction), which intersects the first direction (e.g., the x-axis direction) and the third direction (e.g., the y-axis direction). The 1-2$^{nd}$ grooves GH121 and GH122 may extend from the 1-1$^{st}$ groove GH11, and may be disposed in portions of the peripheral regions PR1 and PR2 of each of the bodies BA and BB that are opposite the enclosure 300A in the second direction (e.g., the z-axis direction). For example, each of the partition walls SWA and SWB may include an end portion EP. The first groove GH1 may be disposed in the end portion EP of each of the partition walls SWA and SWB, and may provide a space for accommodating the fourth gasket 150, whereby the cell stack 122 may be sealed by the enclosure 300A and the first and second end plates 110A and 110B.

Referring to FIGS. 5 and 6, a gasket groove (hereinafter referred to as a "second groove") GH2, which is disposed in the enclosure 300A, may include at least one of a 2-1$^{st}$ groove GH21 or 2-2$^{nd}$ grooves GH221 and GH222. The 2-1$^{st}$ groove GH21 may be disposed in a portion of the enclosure 300A that is opposite each of the partition walls SWA and SWB of the first and second end plates 110A and 110B in the second direction (e.g., the z-axis direction), which intersects the first direction (e.g., the x-axis direction) and the third direction (e.g., the y-axis direction). The 2-2$^{nd}$ grooves GH221 and GH222 may extend from the 2-1$^{st}$ groove GH21, and may be disposed in portions of the enclosure 300A that are opposite the peripheral regions PR1 and PR2 of each of the bodies BA and BB in the second direction (e.g., the z-axis direction).

As described above, according to the embodiment, the fuel cell 100A may include only the first groove GH1, may include only the second groove GH2, or may include both the first groove GH1 and the second groove GH2.

In order to help understand the embodiment, the portion in which the first groove GH1 or the second groove GH2 is formed is indicated by a dotted line in FIG. 6.

In the case in which the fuel cell 100A includes both the first groove GH1 and the second groove GH2, the depth d1 of the first groove GH1 may be greater than or less than the depth d2 of the second groove GH2.

In the case in which the fuel cell 100A includes only the first groove GH1 but does not include the second groove GH2, the fourth gasket 150 may be attached so as to protrude toward the upper surface 300U of the enclosure 300A and may be accommodated in the first groove GH1. Alternatively, in the case in which the fuel cell 100A includes only the second groove GH2 but does not include the first groove GH1, the fourth gasket 150 may be attached so as to protrude toward the upper surface HS of each of the partition walls SWA and SWB and may be accommodated in the second groove GH2.

Similar to the configuration in which the fourth gasket 150 is disposed in the first and second grooves GH1 and GH2 formed in at least one of the upper surface 300U of the enclosure 300A or the upper surface HS of each of the partition walls SWA and SWB, a fifth gasket (not shown) may be disposed in a hole formed in at least one of the lower surface 300L of the enclosure 300A or the lower surface LS of each of the partition walls SWA and SWB.

As a result, in the fuel cell 100A according to the embodiment, the fourth gasket 150, which is disposed in at least one of the first groove GH1 or the second groove GH2, blocks the gap between the enclosure 300A and each of the end plates 110A and 110B, thereby forming a continuous sealing line (e.g., a watertight line).

The fuel cell 100A or 100B may further include a clamping member 130. The clamping member 130 serves to clamp a plurality of unit cells in the first direction (e.g., the x-axis direction) together with the first and second end plates 110A and 110B.

Referring to FIGS. 4 and 5, the clamping member 130 and the enclosure 300A may be spaced apart from each other. This is for electrically insulating the clamping member 130 and the enclosure 300A from each other. For example, the upper surface of the clamping member 130 and the upper surface 300H of the enclosure 300A may be spaced a predetermined distance SD apart from each other.

For example, as indicated by a dotted line in FIGS. 6 and 9, the clamping member 130 may have a bar shape, but the embodiment is not limited thereto. That is, according to another embodiment, the clamping member 130 may be formed in a long bolt shape, a belt shape, or a rigid rope shape to clamp the unit cells. When the clamping member 130 is formed in a bar shape, as shown in FIGS. 6 and 9, it is possible to reduce the height of the fuel cell 100A or 100B in the second direction (e.g., the z-axis direction), which intersects the first direction (e.g., the x-axis direction) and the third direction (e.g., the y-axis direction), compared to when the clamping member 130 is formed in a long bolt shape.

An example of fastening the clamping member 130 to the fuel cell 100A or 100B will now be described.

The first and second end plates 110A and 110B may be disposed on the respective ends of the cell stack 122, in which a plurality of unit cells is repeatedly stacked. This assembly may be placed in clamping equipment, and an appropriate load may be applied thereto. In this state, the cell stack 122 may be clamped to the first and second end plates 110A and 110B using the clamping member 130.

The clamping member 130 may include first and second portions P1 and P2. The first portion P1 may be disposed on an upper portion of the cell stack 122 and on upper portions of the bodies BA and BB of the target end plates, e.g., the first and second end plates 110A and 110B. The second portion P2 may be bent and extend from the first portion P1 to the outer surfaces 110AO and 110BO of the bodies BA and BB. In this case, the second portion P2 of the clamping member 130 may be accommodated in space between the outer surfaces 110AO and 110BO of the bodies BA and BB and the partition walls SWA and SWB.

In addition, according to the embodiment, the second portion P2 may include a second through-hole TH2. The second through-hole TH2 may be formed so as to allow the coupling screw 160 to pass therethrough, and may be disposed so as to be opposite a portion of the first through-hole TH1. As such, since the coupling screw 160 passes through both the first and second through-holes TH1 and TH2, which are opposite each other, the fixing force of the coupling screw 160 may further increase.

Hereinafter, a fuel cell according to a comparative example and the fuel cell according to the embodiment will be described with reference to the accompanying drawings.

Figure 11:
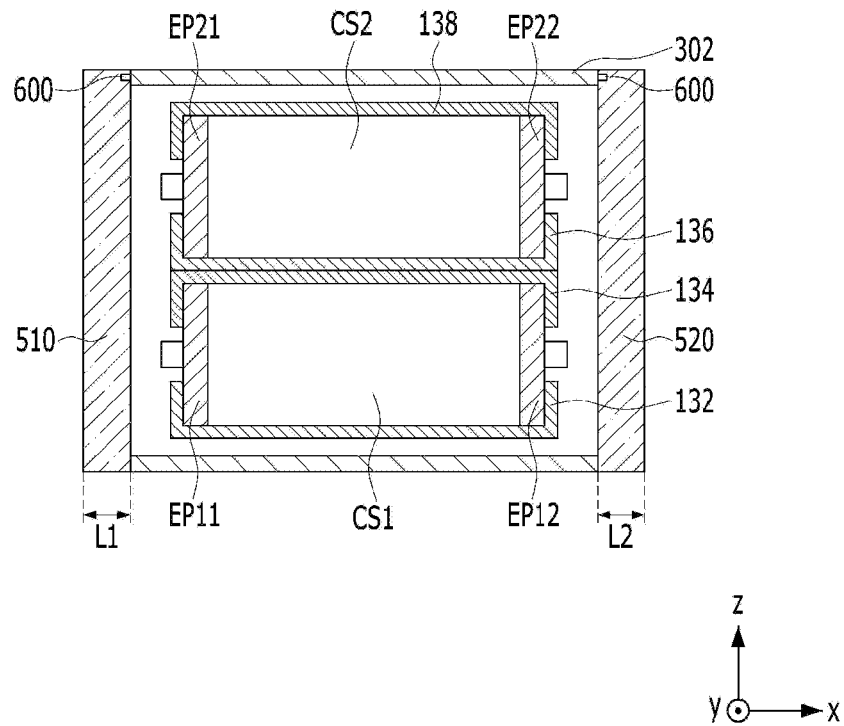
FIG. 11 is a cross-sectional view of a fuel cell according to a first comparative example.

FIG. 11 is a cross-sectional view of a fuel cell according to a first comparative example, which includes first and second stack modules stacked in the second direction (e.g., the z-axis direction), an enclosure 302, a manifold block 510, and a side cover 520.

The first stack module shown in FIG. 11 includes a cell stack CS1, first and second end plates EP11 and EP12, and clamping members 132 and 134, and the second stack module includes a cell stack CS2, first and second end plates EP21 and EP22, and clamping members 136 and 138. The cell stacks CS1 and CS2, the clamping members 132, 134, 136 and 138, the first end plates EEP11 and EP21, the second end plates EP12 and EP22, and the enclosure 302 perform the same functions as the cell stack 122, the clamping member 130, the first end plate 110A, the second end plate 110B, and the enclosure 300A or 300B of the fuel cell 100A or 100B according to the embodiment, respectively.

Hydrogen and air may be supplied to the cell stacks CS1 and CS2 through the manifold block 510 shown in FIG. 11, and coolant may be supplied to the cell stacks CS1 and CS2 through the side cover 520. In addition, in the case of the fuel cell according to the first comparative example shown in FIG. 11, high-voltage wiring for series connection (or parallel connection) may be further provided.

Referring to FIG. 11, a watertight line 600 is formed between the manifold block 510 and the enclosure 302 and between the side cover 520 and the enclosure 302. In order to form the watertight line 600, a space having a size of about 100 mm or more, which corresponds to the sum of the first thickness L1 of the manifold block 510 and the second thickness L2 of the side cover 520, may be required unnecessarily.

In addition, in the fuel cell shown in FIG. 11, a dead space may be eliminated by disposing the U-shaped clamping members 132 to 136 on the cell stacks CS1 and CS2, but it may be difficult to secure a watertight structure when a coupling bolt is fastened thereinto.

Figure 12:
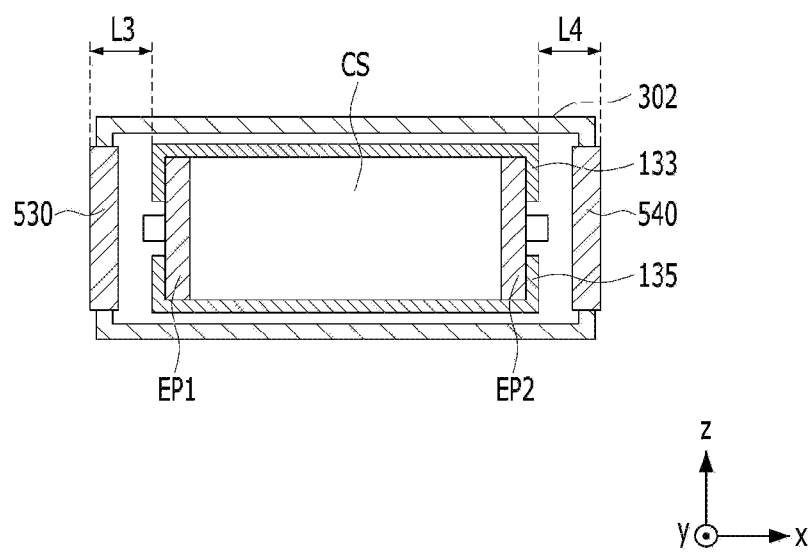
FIG. 12 is a cross-sectional view of a fuel cell according to a second comparative example.

FIG. 12 is a cross-sectional view of a fuel cell according to a second comparative example, which includes a single stack module, an enclosure 302, and side covers 530 and 540.

The stack module shown in FIG. 12 includes a cell stack CS, first and second end plates EP1 and EP2, and clamping members 133 and 135. The cell stack CS, the clamping members 133 and 135, the first end plate EP1, the second end plate EP2, and the enclosure 302 perform the same functions as the cell stack 122, the clamping member 130, the first end plate 110A, the second end plate 110B, and the enclosure 300A or 300B of the fuel cell 100A or 100B according to the embodiment, respectively.

In order to minimize the additional space required for installing the fuel cell in a vehicle, the fuel cell having the configuration shown in FIG. 12 may be used instead of the fuel cell shown in FIG. 11. In this case, the number of parts constituting the fuel cell may be reduced. However, the fuel cell according to the second comparative example shown in FIG. 12 requires separate side covers 530 and 540 to seal the fuel cell. When the separate side covers 530 and 540 are provided, a space having a size of about 100 mm or more, which corresponds to the sum of the distance L3 between the side cover 530 and the clamping members 133 and 135 and the distance L4 between the side cover 540 and clamping members 133 and 135, may be required unnecessarily.

Unlike the first and second comparative examples described above, the fuel cell 100A or 100B according to the embodiment includes the partition walls SWA and SWB, the connecting portions CA and CB, and the cap 170 in order to seal the cell stack 122. In this case, the length of the fuel cell 100A or 100B may be increased by the first length D1 in the first direction (e.g., the x-axis direction) by the partition wall SWA or SWB and the connecting portion CA or CB, and may be further increased by the thickness D2 of the cover portion 174 of the cap 170 in the first direction (e.g., the x-axis direction). That is, the length of each end of the fuel cell 100A or 100B is increased by the sum of D1 and D2 due to a respective one of the first and second end plates 110A and 110B and the cap 170. For example, when D1 is about 10 mm and D2 is 6 mm to 8 mm, the total increase in the length of the fuel cell 100A or 100B is 32 mm to 36 mm. Thus, it can be seen that the fuel cell according to the embodiment has a smaller length in the first direction than the fuel cells according to the first and second comparative examples. That is, since the partition walls SWA and SWB, which are integrally formed with the bodies BA and BB of the end plates 110A and 110B and extend from the bodies BA and BB, or the partition walls SWA and SWB, which are formed separately from the bodies BA and BB and are coupled to the bodies BA and BB, are coupled to the enclosure 300A or 300B, the fuel cell 100A or 100B according to the embodiment does not require separate side covers (refer to 530 and 540 in FIG. 12), and thus the length of the fuel cell in the first direction may be reduced.

When the gasket grooves GH1 and GH2 are formed in the clamping member 130, a leak point, at which the sealing is deteriorated, may be generated. However, in the fuel cell 100A or 100B according to the embodiment, the gasket grooves GH1 and GH2 are formed in at least one of the partition walls SWA and SWB, the bodies BA and BB, or the enclosure 300A or 300B, and the space between the enclosure 300A or 300B and the end plates 110A and 110B may be sealed without a leak point by the fourth gasket 150, as shown in FIGS. 6 and 9, thereby exhibiting excellent sealing performance.

In addition, the fuel cell 100A or 100B according to the embodiment may further maximize the sealing effect thereof using the cap 170.

As is apparent from the above description, a fuel cell according to the embodiment may have a reduced length in the direction in which a plurality of cells is stacked, and may have excellent sealing performance.

The above-described various embodiments may be combined with each other without departing from the object of the present disclosure unless they are contrary to each other. In addition, for any element that is not described in detail of any of the various embodiments, reference may be made to the description of an element having the same reference numeral in another embodiment.

While the present disclosure has been particularly shown and described with reference to exemplary embodiments thereof, these embodiments are only proposed for illustrative purposes and do not restrict the present disclosure, and it will be apparent to those skilled in the art that various changes in form and detail may be made without departing from the essential characteristics of the embodiments set forth herein. For example, respective configurations set forth in the embodiments may be modified and applied. Further, differences in such modifications and applications should be construed as falling within the scope of the present disclosure as defined by the appended claims.

What is claimed is:

1. A fuel cell, comprising:
   a cell stack comprising a plurality of unit cells stacked in a first direction;
   an enclosure surrounding side portions of the cell stack, the enclosure comprising at least one opening to expose at least one of opposite end portions of the cell stack therethrough;
   first and second end plates respectively disposed at the opposite end portions of the cell stack;
   a gasket disposed between a target end plate disposed in the at least one opening in the enclosure, among the first and second end plates, and the enclosure, the gasket being configured to seal the cell stack, wherein the target end plate comprises a body that comprises an inner surface that faces the cell stack and an outer surface that is opposite the inner surface, wherein the gasket is disposed between the body and the enclosure; and
   a partition wall disposed so as to face at least a portion of the outer surface of the body in the first direction, the body and the partition wall sealing the cell stack together with the enclosure using the gasket, wherein the gasket is disposed between the partition wall and the enclosure;
   wherein the outer surface of the body comprises a non-manifold region in which no manifold is disposed and a manifold region in which a manifold is disposed, the non-manifold region being coupled to the partition wall and the manifold region being not coupled to the partition wall;
   wherein a portion of the gasket is disposed between the body and the enclosure in the manifold region; and
   wherein the other portion of the gasket is disposed between the partition wall and the enclosure in the non-manifold region.

2. The fuel cell according to claim 1, further comprising a connecting portion connecting the body and the partition wall to each other.

3. The fuel cell according to claim 2, wherein the body and the partition wall are integrally formed with each other.

4. The fuel cell according to claim 3, wherein the body, the partition wall, and the connecting portion are integrally formed with each other.

5. The fuel cell according to claim 2, wherein the body and the partition wall are formed separately from each other.

6. The fuel cell according to claim 5, wherein the connecting portion is integrally formed with the body and is formed separately from the partition wall.

7. The fuel cell according to claim 5, wherein the connecting portion is integrally formed with the partition wall and is formed separately from the body.

8. A fuel cell, comprising:
   a cell stack comprising a plurality of unit cells stacked in a first direction;
   an enclosure surrounding side portions of the cell stack, the enclosure comprising at least one opening to expose at least one of opposite end portions of the cell stack therethrough;
   first and second end plates respectively disposed at the opposite end portions of the cell stack;
   a clamping member clamping the cell stack together with the first and second end plates;
   a gasket disposed between a target end plate disposed in the at least one opening in the enclosure, among the first and second end plates, and the enclosure, the gasket being configured to seal the cell stack, wherein the target end plate comprises a body that comprises an inner surface that faces the cell stack and an outer surface that is opposite the inner surface, wherein the gasket is disposed between the body and the enclosure; and
   a partition wall disposed so as to face at least a portion of the outer surface of the body in the first direction, the body and the partition wall sealing the cell stack together with the enclosure using the gasket, wherein the gasket is disposed between the partition wall and the enclosure;
   wherein the outer surface of the body comprises a non-manifold region in which no manifold is disposed and a manifold region in which a manifold is disposed, the non-manifold region being coupled to the partition wall and the manifold region being not coupled to the partition wall;
   wherein a portion of the gasket is disposed between the body and the enclosure in the manifold region; and
   wherein the other portion of the gasket is disposed between the partition wall and the enclosure in the non-manifold region.

9. The fuel cell according to claim 8, further comprising a coupling screw penetrating the partition wall and the clamping member and to be inserted into an interior of the body.

10. The fuel cell according to claim 8, further comprising a cap covering the coupling screw.

11. The fuel cell according to claim 10, wherein the partition wall comprises:
    an end portion coupled to the enclosure; and
    a first through-hole through which the coupling screw passes.

12. The fuel cell according to claim 11, wherein the cap comprises:
a cover portion configured to cover the coupling screw; and
a support portion extending from the cover portion in the first direction to be inserted into the first through-hole.

13. The fuel cell according to claim 11, wherein the clamping member comprises:
a first portion disposed on an upper portion of the cell stack and on an upper portion of the target end plate; and
a second portion bent and extending from the first portion to the outer surface of the body, wherein the second portion comprises a second through-hole through which the coupling screw passes, and the second through-hole is opposite a portion of the first through-hole.

14. The fuel cell according to claim 9, wherein the body of the target end plate comprises an insert portion having first rigidity and a shell portion having second rigidity lower than the first rigidity, the shell portion surrounding the insert portion;
wherein the body comprises a blind hole into which the coupling screw is fastened; and
wherein the blind hole penetrates the shell portion and extends to the insert portion.

15. A fuel cell, comprising:
a cell stack comprising a plurality of unit cells stacked in a first direction;
an enclosure surrounding side portions of the cell stack, the enclosure comprising at least one opening to expose at least one of opposite end portions of the cell stack therethrough;
first and second end plates respectively disposed at the opposite end portions of the cell stack:
a gasket disposed between a target end plate disposed in the at least one opening in the enclosure, among the first and second end plates, and the enclosure, the gasket being configured to seal the cell stack, wherein the target end plate comprises a body that comprises an inner surface that faces the cell stack and an outer surface that is opposite the inner surface, wherein the gasket is disposed between the body and the enclosure;
a partition wall disposed so as to face at least a portion of the outer surface of the body in the first direction, the body and the partition wall sealing the cell stack together with the enclosure using the gasket, wherein the gasket is disposed between the partition wall and the enclosure; and
a gasket groove disposed in the enclosure or the partition wall to accommodate the gasket;
wherein the outer surface of the body comprises a non-manifold region in which no manifold is disposed and a manifold region in which a manifold is disposed, the non-manifold region being coupled to the partition wall and the manifold region being not coupled to the partition wall;
wherein a portion of the gasket is disposed between the body and the enclosure in the manifold region; and
wherein the other portion of the gasket is disposed between the partition wall and the enclosure in the non-manifold region.

16. The fuel cell according to claim 15, wherein the gasket groove comprises a groove disposed in the target end plate, the groove disposed in a portion of the partition wall that is opposite the enclosure in a second direction intersecting the first direction.

17. The fuel cell according to claim 15, wherein the gasket groove comprises a groove disposed in the enclosure, the groove disposed in a portion of the enclosure that is opposite the partition wall in a second direction intersecting the first direction.

18. The fuel cell according to claim 15, wherein the gasket groove comprises a first groove and a second groove extending from the first groove, the second groove being disposed in a portion of the manifold region of the body that is opposite the enclosure in a second direction intersecting the first direction.

19. The fuel cell according to claim 15, wherein the gasket groove a first groove and a second groove extending from the first groove, the second groove being disposed in a portion of the enclosure that is opposite the manifold region of the body in a second direction intersecting the first direction.

20. The fuel cell according to claim 15, further comprising a connecting portion connecting the body and the partition wall to each other.

* * * * *